United States Patent [19]
Barron et al.

[11] B 3,923,746

[45] Dec. 2, 1975

[54] ONE-PACKAGE POLYURETHANE COATINGS

[75] Inventors: Benny Gene Barron; Russell Henry Cramm, both of Lake Jackson, Tex.

[73] Assignee: The Dow Chemical Company, Midland, Mich.

[22] Filed: Nov. 16, 1973

[21] Appl. No.: 416,710

[44] Published under the Trial Voluntary Protest Program on January 28, 1975 as document no. B 416,710.

[52] U.S. Cl. ... 260/77.5 AP; 117/128.4; 117/138.8; 117/142; 117/148
[51] Int. Cl.² .......................................... C08G 18/32
[58] Field of Search ............................ 260/77.5 AP

[56] References Cited
UNITED STATES PATENTS 3,591,547  7/1971  Boudakian et al........... 260/77.5 AP Primary Examiner—M. J. Welsh
Attorney, Agent, or Firm—James G. Carter

[57] ABSTRACT

NCO-containing prepolymers which are soluble in organic hydrocarbon solvents are prepared by reacting a stoichiometric excess of an organic diisocyanate with a polyol that is the reaction product of a polyhydroxyl initiator compound such as glycerine with certain glycidyl ethers such as the glycidyl ether of the n-butyl ether of ethylene glycol.

These coatings are acceptable under Los Angeles County, California Rule 66.

10 Claims, No Drawings

ONE-PACKAGE POLYURETHANE COATINGS

This invention relates to polyurethane coatings and more particularly to the so-called one-package polyurethane coatings and substrates coated therewith.

One-package polyurethane coatings have heretofore been prepared from NCO-containing reaction products of polyether polyols having an average functionality of from 2 to 3 and organic polyisocyanates. However, these NCO-terminated products are not compatible with the organic hydrocarbon solvents approved for use in coatings under Rule 66 for Los Angeles County, Calif., but rather require dilution to application viscosities with the more photochemically reactive, smog producing solvents, high levels of which are prohibited by Rule 66, such as esters, ketones, aromatic hydrocarbons and the like.

It has now been discovered that one-package urethane coatings can be prepared which can be employed without solvents or, if for some applications a reduction in viscosity is desired, the less photochemically reactive organic hydrocarbon solvents can be employed.

The coating compositions of the present invention comprise:

A. an NCO-containing prepolymer which is the reaction product of
   1. a polyol resulting from the reaction of
      a. a polyhydroxyl-containing initiator compound containing from 2 to 4 hydroxyl groups or mixture of such compounds with
      b. from about 1 to about 3 and preferably from about 1.5 to about 2.5 moles per hydroxyl group contained in (A-1-a) of a glycidyl ether represented by the general formula

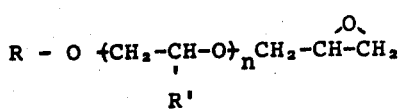

wherein R is an aliphatic hydrocarbon radical having from about 4 to about 10 carbon atoms, R' is hydrogen or a methyl or ethyl group and n has a value of 0 to 2, provided that when n is zero, R contains at least 6 carbon atoms, and mixtures of such glycidyl ethers; with
   2. an organic diisocyanate, in quantities so as to provide an NCO:OH ratio of from about 1.5:1 to about 2:1 and preferably from about 1.6:1 to about 1.8:1;
B. optionally as a solvent or viscosity reducing agent, from 0 to about 50, preferably from about 20 to about 30 percent by weight of an organic hydrocarbon solvent; and
C. a catalytic quantity of a catalyst for urethane formation.

Suitable hydroxyl-containing initiator compounds include, for example, glycerine, trimethylol propane, pentaerythritol, mixtures thereof and the like.

Suitable glycidyl ethers which can be reacted with the polyhydroxyl-containing compounds include, for example, the glycidyl ethers of the n-butyl ether of ethylene glycol, the isobutyl ether of propylene glycol, the n-octyl ether of diethylene glycol, hexanol, mixtures thereof and the like.

Suitable organic diisocyanates includes, for example, toluene diisocyanate, 4,4'-methylenebis(phenylisocyanate), tetramethylene diisocyanate, methylenebiscyclohexyl isocyanate, hexamethylene diisocyanate, mixtures thereof and the like.

The polyols employed as Component (A-1) are prepared by any of the known methods such as the base catalyzed reaction of a suitable polyhydroxyl-containing compound with the desired glycidyl ether followed by neutralization and usual product clean-up or they can be prepared by employing a Lewis acid catalyst such as, for example, boron trifluoride etherate and the like.

Suitable organic hydrocarbon solvents include normal and branched paraffinic hydrocarbons such as, for example, iso-octane, decane, Isopar E, isopentane, 2-methyl pentane, and alicyclic hydrocarbons including branched and unbranched cycloparoffins or naphthenes which may contain minor amounts of olefinic unsaturation such as, for example, cyclopentane, cyclohexane, methyl cyclohexane, naptha (a petroleum distillate boiling between about 200°–300°F), mixtures of the above solvents and the like.

Suitable catalysts for urethane formation include tertiary amines and organo-metallic compounds such as, for example, triethylenediamine, diethylcyclohexylamine, N-ethyl morpholine, dibutyl tin dilaurate, stannous octoate, copper naphthenate, lead naphthenate, lead octoate, lead neo-tridecanoate, dibutyl tin diacetate, mixtures thereof and the like.

The catalysts are employed in catalytic quantities which is usually from about 0.01 to about 2.0 and preferably from about 0.5 to about 1.0 percent by weight based upon the weight of the NCO-containing prepolymer.

The coating compositions of the present invention can contain other components such as fire retardant agents, colorants and the like.

The coating composition can be applied to substrates, as desired, by such techniques as brushing, roller coating, spraying and the like.

The coatings are cross-linked by the moisture in the air reacting with the free NCO groups, thereby cross-linking the compositions to produce hard surfaced protective and/or decorative films on desired substrates such as wood, metal, leather, fabrics, plastics, and the like.

The following examples are illustrative of the present invention.

EXAMPLE 1

Polyol Preparation

One-half mole (46.05 g) of glycerine containing 1.6 grams of $BF_3$ etherate catalyst was reacted at 77°F with 3 moles (523 g) of the glycidyl ether of the n-butyl ether of ethylene glycol until the glycidyl ether content was reduced to a minimum as indicated by gel permeation chromatography.

Any unreacted glycidyl ether was removed under vacuum at 150°C. The product was neutralized with 10 g. of magnesium silicate with the addition of 3 g. of filter aid and 40 ml. of deionized water. After drying under vacuum at 120°C., the product was filtered. The resulting polyol had a hydroxyl content of 4.98 percent and a viscosity at 100°F of 62.2 centistokes.

Prepolymer Preparation 170.5 grams of the above prepared polyol was added dropwise while stirring under a nitrogen atmosphere at 50°C. to 87 g. of an 80/20 mixture of 2,4-/2,6-toluene diisocyanate. After the addition of the isocyanate was completed, the temperature was raised to 55°C, and maintained thereat for about 4 hours. The resultant product had an NCO content of 8.35 percent and was soluble in Isopar E (an isoparoffinic hydrocarbon fraction composed principally of $C_8$ isomers having a boiling range of 240°–290°F. commercially available from Exxon Corporation).

Preparation of Coating

A coating was prepared consisting of 75 percent the above prepared prepolymer and 25 percent by weight of Isopar E solvent. The mixture was catalyzed with 0.1 percent by weight of dibutyl tin dilaurate catalyst.

The above prepared coating was then applied to a Bonderite 37 cold rolled steel panel and the coatings air dried at room temperature. The coated panel had a reverse impact of 160 in — lbs.

EXAMPLE 2

Polyol Preparation

In a manner similar to Example 1, A polyol was prepared from the following:
  46 grams (½ mole) glycerine
  475 grams (3 moles) hexyl glycidyl ether
  0.5 ml $BF_3$ etherate The resultant polyol had a % OH of 5.78.

Prepolymer Preparation

In a manner similar to Example 1, a prepolymer was prepared from the following:
  147 grams of the above prepared polyol
  87 grams of an 80/20 mixture of 2,4-/2,6-toluenediisocyanate The resultant prepolymer had a % NCO of 9.35 and was soluble in Isopar E.

Coating Preparation

In a manner similar to Example 1, a coating was prepared from the following:
  75 percent of the above prepared prepolymer
  25 percent of Isopar E
  0.5 percent of dibutyl tin dilaurate A panel coated with the above coating had a reverse impact of 140 in. — lbs.

EXAMPLE 3

Prepolymer Preparation

In a manner similar to Example 1, a prepolymer was prepared from the following:
  137.2 grams of the polyol prepared in Example 1.
  18 grams of an adduct of p,p'-isopropylidenediphenol with propylene oxide employing a mole ratio of about 1 to 2 respectively. The polyol had an OH % of about 9.46.
  87 grams of 80/20, 2,4-/2,6-toluenediisocyanate The resultant prepolymer had a % NCO of 9.05.

The prepolymer was soluble in Isopar E. The prepolymer was also slightly cloudy, so 8.55 grams of methyl n-butyl ketone was added and the prepolymer became clear.

Coating Preparation

In a manner similar to Example 1, a coating was prepared employing the following:
  69 percent of the above prepared prepolymer
  23.8 percent Isopar E
  7.2 percent methyl n-butyl ketone
  0.1 percent dibutyl tin dilaurate A panel coated with the above coating had a reverse impact of 160 in. — lbs.

We claim:

1. A one-package polyurethane coating comprising
  A. an NCO-containing prepolymer which is the reaction product of
    1. A polyol resulting from the reaction of
      a. a polyhydroxyl-containing initiator compound containing from 2 to about 4 hydroxyl groups or a mixture of such compounds, with
      b. from about 1 to about 3 moles per hydroxyl group contained in (A-1-a) of a glycidyl ether selected from glycidyl ethers represented by the general formula

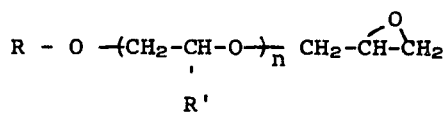

wherein R is an aliphatic hydrocarbon radical having from about 4 to about 10 carbon atoms, R' is hydrogen or a methyl or ethyl group and n has a value of 0 to 2 provided that when n is zero, R contains at least 6 carbon atoms, and mixtures of such glycidyl ethers; with
    2. an organic diisocyanate in quantities so as to provide an NCO:OH ratio of from about 1.5:1 to about 2:1;
  B. optionally, as a viscosity reducing component, from 0 to about 50 percent by weight of an organic hydrocarbon solvent, and
  C. a catalytic quantity of a catalyst for urethane formation.

2. The coating composition of claim 1 wherein Component (A-2) is present in quantities so as to provide an NCO:OH ratio of about 2:1, Component (A-1-b) is employed in quantities of from about 1.5 to about 2.5 moles per hydroxyl group contained in Component (A-1-a) and Component (B) is present in quantities of from about 20 to about 30 percent by weight.

3. The coating composition of claim 2 wherein Component (A-1-b) is selected from the glycidyl ether of the n-butyl ether of ethylene glycol, the glycidyl ether of the isobutyl ether of propylene glycol and the glycidyl ether of hexanol.

4. The coating composition of claim 3 wherein Component (A-1-a) is glycerine.

5. The coating composition of claim 4 wherein Component (A-2) is toluene diisocyanate.

6. A substrate coated with the composition of claim 1.

7. A substrate coated with the composition of claim 2.

8. A substrate coated with the composition of claim 3.

9. A substrate coated with the composition of claim 4.

10. A substrate coated with the composition of claim 5.

* * * * *